UNITED STATES PATENT OFFICE.

CHARLES HERENDEEN, OF CHICAGO, ILLINOIS.

PROCESS OF MAKING FLOUR.

958,494.

Specification of Letters Patent.  Patented May 17, 1910.

No Drawing.  Application filed July 24, 1909. Serial No. 509,438.

*To all whom it may concern:*

Be it known that I, CHARLES HERENDEEN, a citizen of the United States, residing at Chicago, in the county of Cook and State of Illinois, have invented certain new and useful Improvements in Processes of Making Flour, of which the following is a specification.

My invention relates to an improved process of making flour, and it has for its object the defining of an economical and expeditious process for this purpose, and one which will produce a flour which is capable of absorbing and retaining more moisture than flour prepared in the ordinary manner, and also a flour in the use of which there is a marked resulting economy in the required amount of yeast or other leavening medium employed therein, and also a material saving in the amount of shortening and sugar necessary to be employed therewith.

A further economy in the means employed in my process consists in the use of cold rolls, thus effecting a saving in the heating of the rolls employed in hot processes, and a further economy of time in the cooling of the product between the various steps of the process which I employ.

Flour prepared in the usual manner is capable of absorbing moisture only to an extent of about seventy-five per cent. of its own weight. Flour prepared according to my method will absorb moisture from five to six times its own weight, and by using a mixture of flour prepared according to my method and flour prepared in the ordinary manner I produce a product capable of absorbing the required degree of moisture and a product from which bread can be made having the superior characteristics hereinbefore enumerated. In addition to the superior quality of the bread made from my product when combined as stated with flour prepared according to the ordinary method, a larger amount of bread can be made from a given quantity of flour.

In the practice of my process I take meal or grits, either fine or coarse, which may be of wheat, corn, rye or other cereals having a high starch content, and place the same in a suitable container into which steam is injected for a sufficient period, conditioned upon the quantity of the mass to be treated, to open up and disrupt the starch cells therein and moisten the mass. I do not wish to be understood as defining in this step a cooking process but the subjecting of the mass of material to the action of the steam for a sufficient period, which I have found does not exceed a period of thirty seconds of time, or only sufficient to subject each particle of the mass to the disrupting and moistening influence of the steam. I then pass the material between cold rolls which serve to compress the mass and which, after passing through such rolls, breaks up into light flaky particles, and which, in their passage from these rolls, become sufficiently dry by exposure to the atmosphere or, if it be found necessary, can be run through containers in which they may be subjected to a blast of air. These flakes in their dry condition are then passed between reducing rolls and ground into flour of any desired fineness. The resulting product is then combined in proportioned degree with ordinary wheat, Graham, rye, or other flour prepared in the ordinary manner, and in the proportions of about from five to twenty-five pounds of my flour to one hundred pounds of flour prepared in the ordinary manner. I have found that the result of this mixture produces a product having high moisture absorbing properties and one from which bread, cakes, pastry, or other bakers' products may be made which will be more palatable and nourishing as food and which will retain their freshness for a longer period. I have also found that with this mixture a larger proportion of the products can be produced from a given quantity thereof than is possible from flour prepared in the ordinary manner alone. I have also found that in the use of my flour the same effects a material saving in the amount of yeast, shortening and sweetening materials employed in the making of bread and pastry products.

Having thus described my invention what I claim as new and desire to secure by Letters Patent is:

1. The process of making flour which consists in subjecting grits or meal to the action of steam for a sufficient period to disrupt the starch cells therein, passing the resulting product in a thin film through rolls to flake the same, grinding the resulting flakes into flour and mixing therewith a larger quantity of ordinary flour, in which the starch cells are not ruptured.

2. The process of making flour which consists in subjecting grits or meal to the action of steam for a sufficient period to disrupt the starch cells therein, passing the resulting product in a thin film through cold rolls to flake the same, drying said flakes, grinding the same into flour, and mixing therewith a larger quantity of ordinary flour in which the starch cells are not ruptured.

In testimony whereof I affix my signature in presence of two witnesses.

CHARLES HERENDEEN.

Witnesses:
K. E. KLEIN,
E. L. WHITE.